(No Model.) 7 Sheets—Sheet 1.

G., J. G. & M. O. REHFUSS.
MACHINE FOR DRESSING TYPE.

No. 527,371. Patented Oct. 9, 1894.

WITNESSES:
P. H. Eagle.
L. Douville.

INVENTORS.
George Rehfuss
John George Rehfuss
Martin O. Rehfuss
BY John A. Wiedersheim
ATTORNEY.

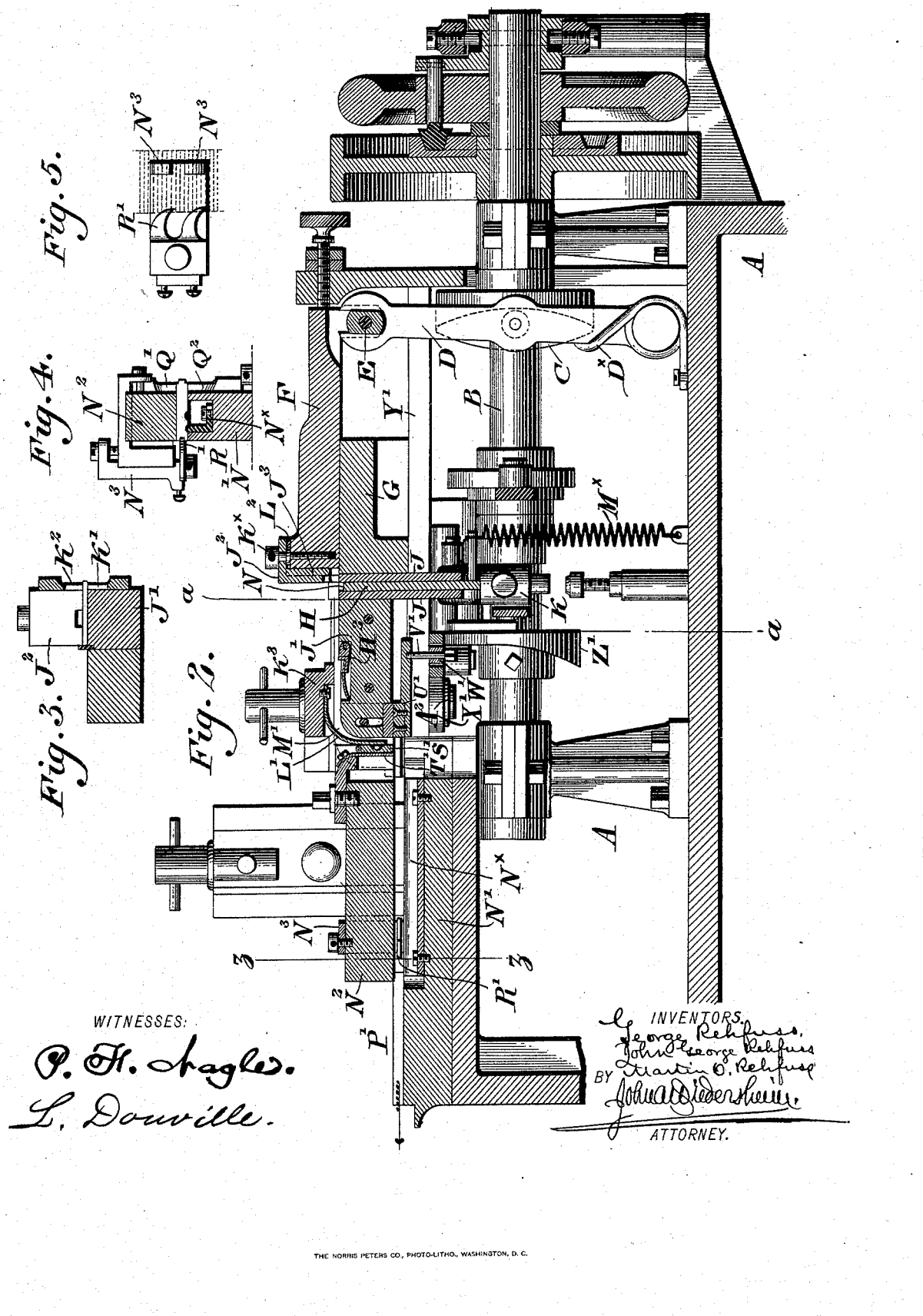

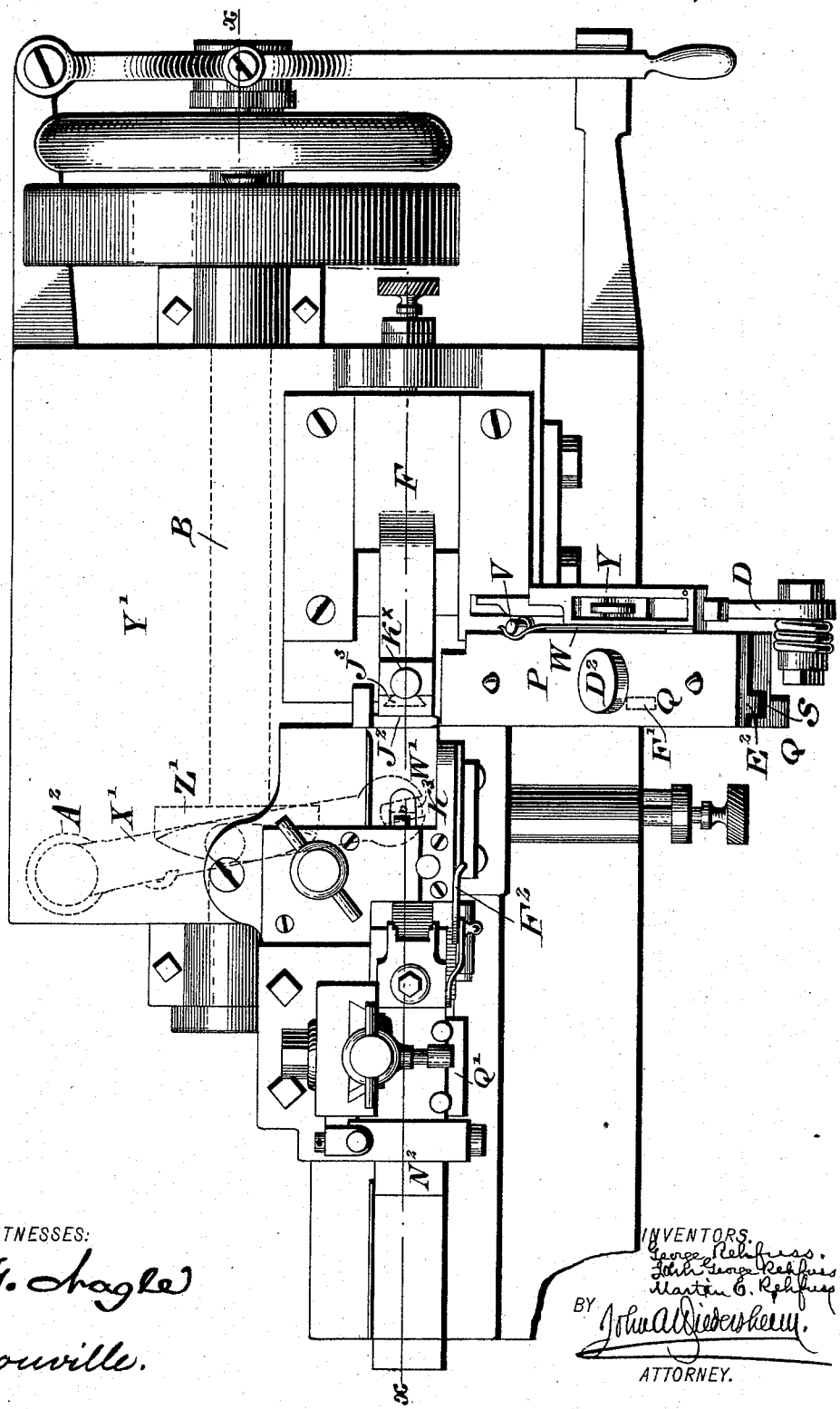

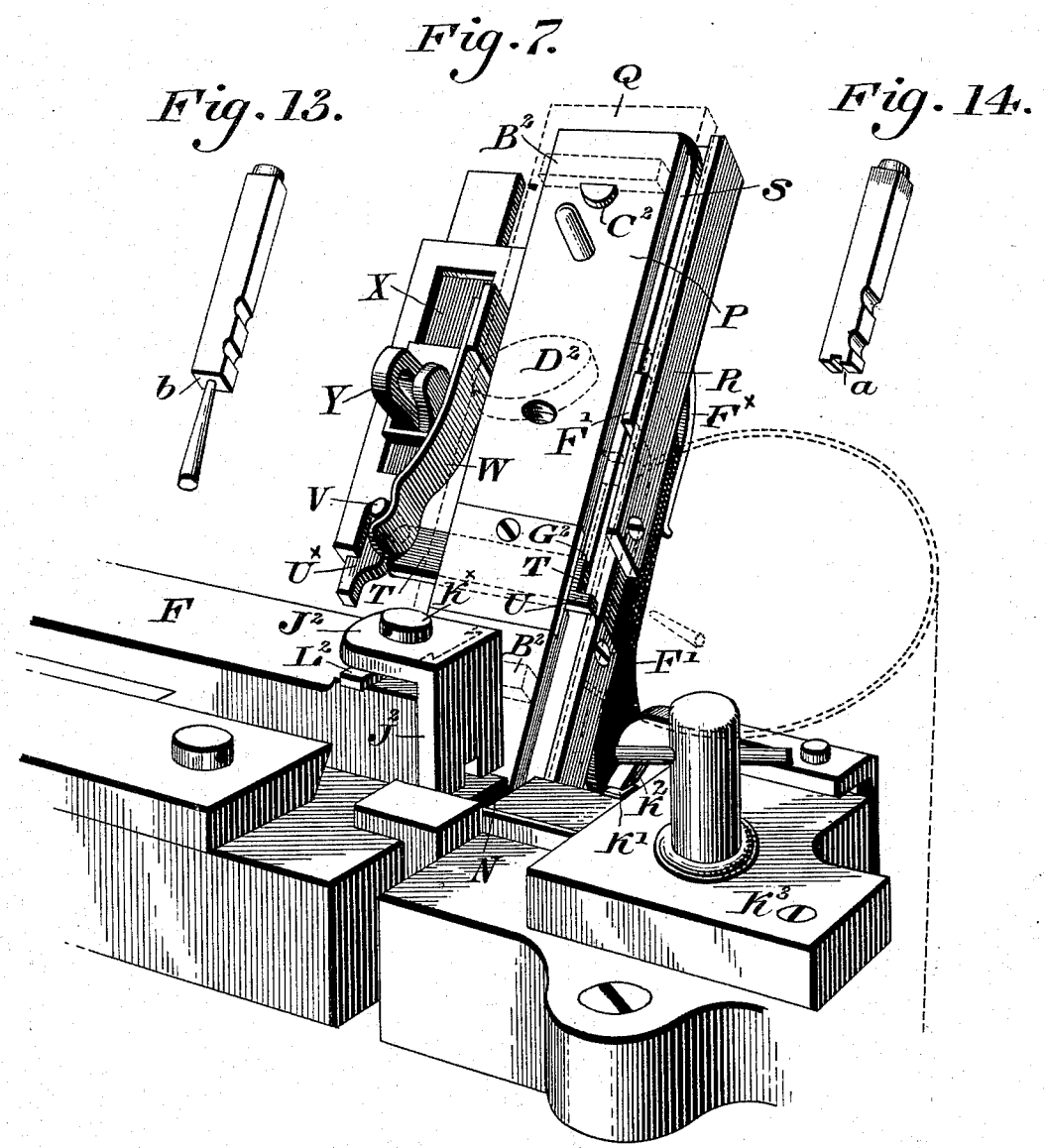

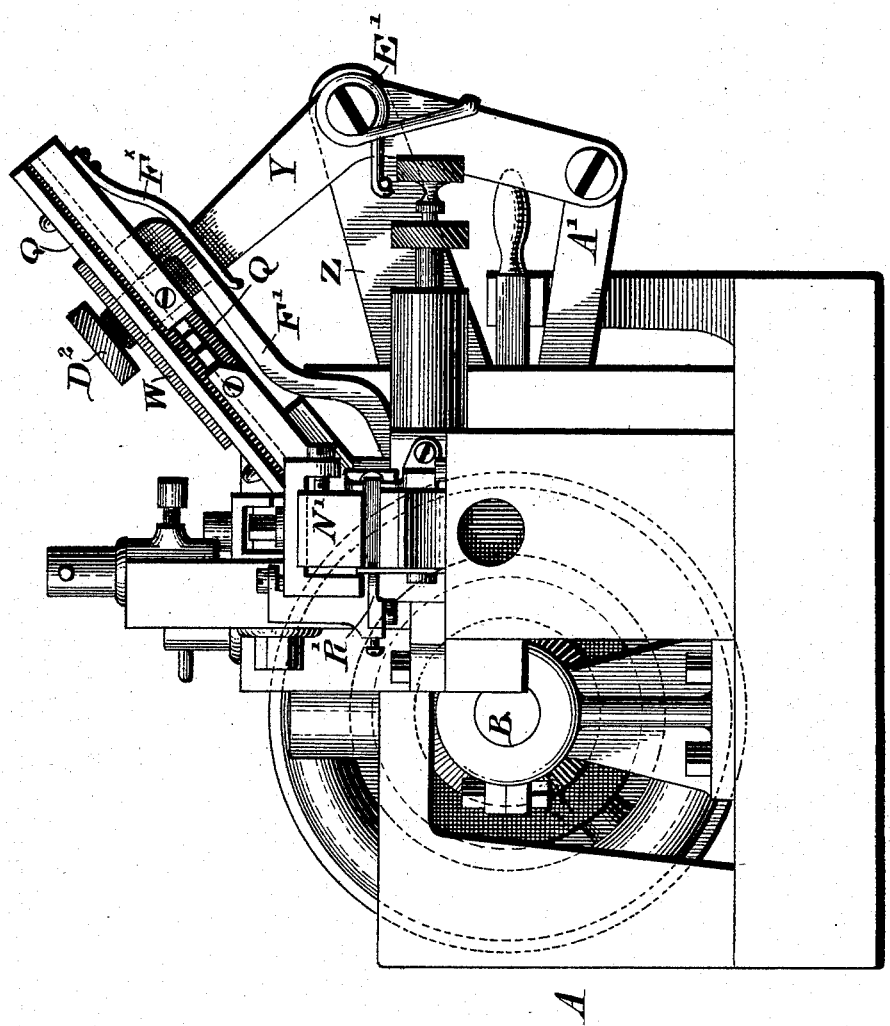

(No Model.) 7 Sheets—Sheet 6.

G., J. G. & M. O. REHFUSS.
MACHINE FOR DRESSING TYPE.

No. 527,371. Patented Oct. 9, 1894.

WITNESSES:
O. H. Eagle.
L. Douville.

INVENTORS.
George Rehfuss.
John George Rehfuss.
Martin O. Rehfuss.
BY
John A. Wiedersheim
ATTORNEY.

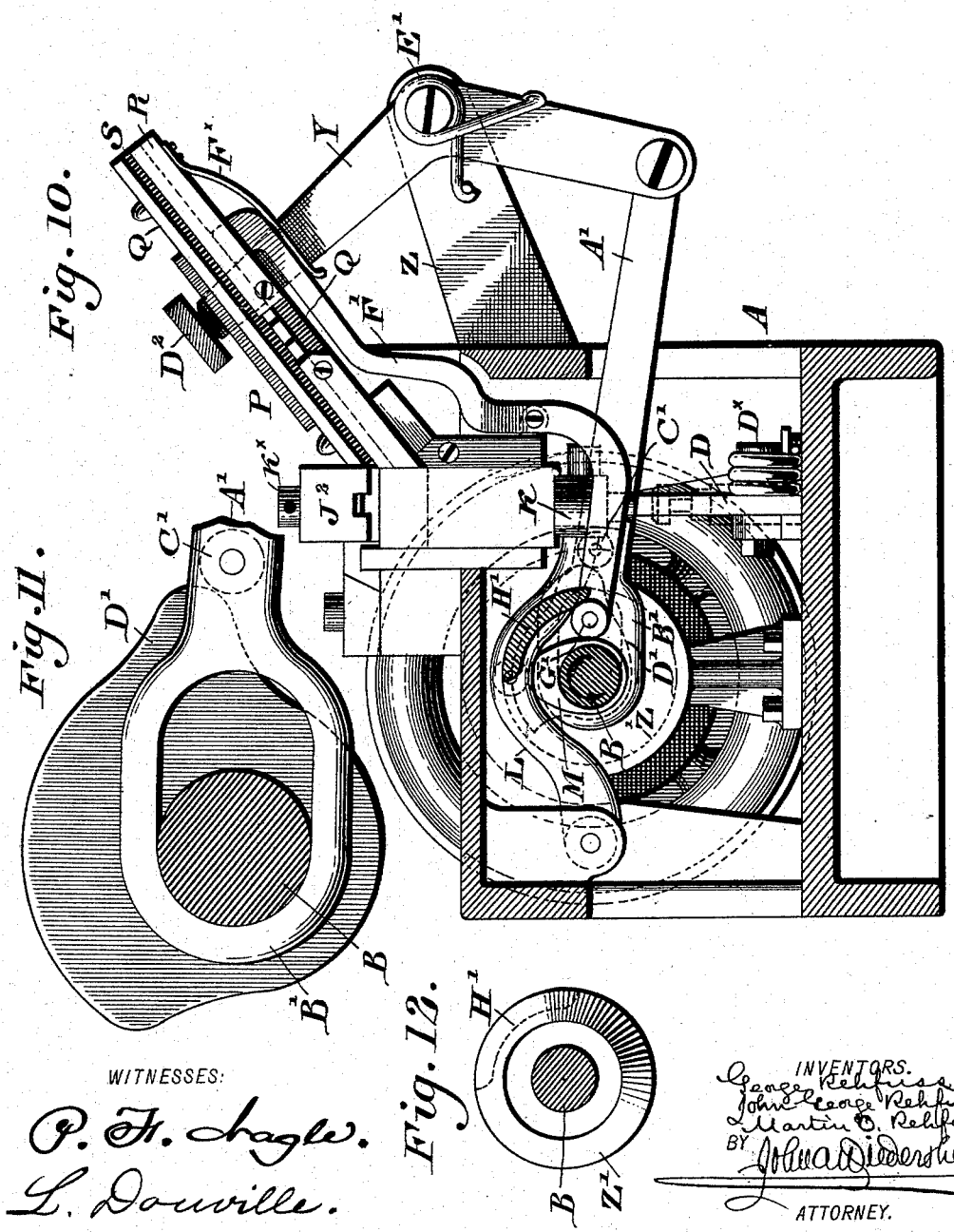

UNITED STATES PATENT OFFICE.

GEORGE REHFUSS, JOHN GEORGE REHFUSS, AND MARTIN O. REHFUSS, OF PHILADELPHIA, PENNSYLVANIA, ASSIGNORS TO WILLIAM W. FARMER, OF NEW YORK, N. Y.

MACHINE FOR DRESSING TYPE.

SPECIFICATION forming part of Letters Patent No. 527,371, dated October 9, 1894.

Application filed December 1, 1893. Serial No. 492,488. (No model.)

*To all whom it may concern:*

Be it known that we, GEORGE REHFUSS, JOHN GEORGE REHFUSS, and MARTIN O. REHFUSS, citizens of the United States, all residing in the city and county of Philadelphia, State of Pennsylvania, have invented a new and useful Improvement in Machines for Dressing Type, which improvement is fully set forth in the following specification and accompanying drawings.

Our invention consists of improvements in type dressing machines as hereinafter set forth.

Figure 1:
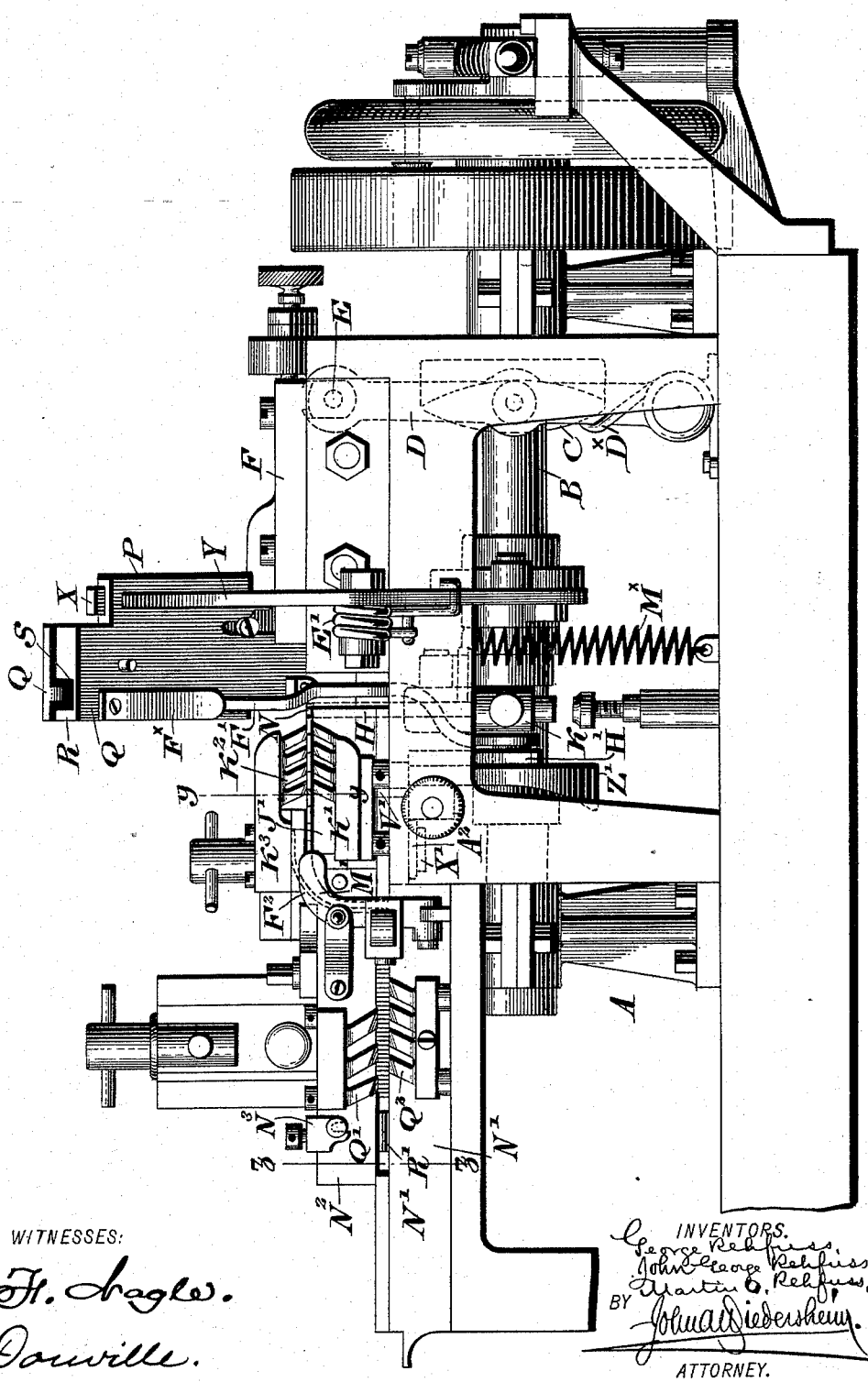
Figure 9:
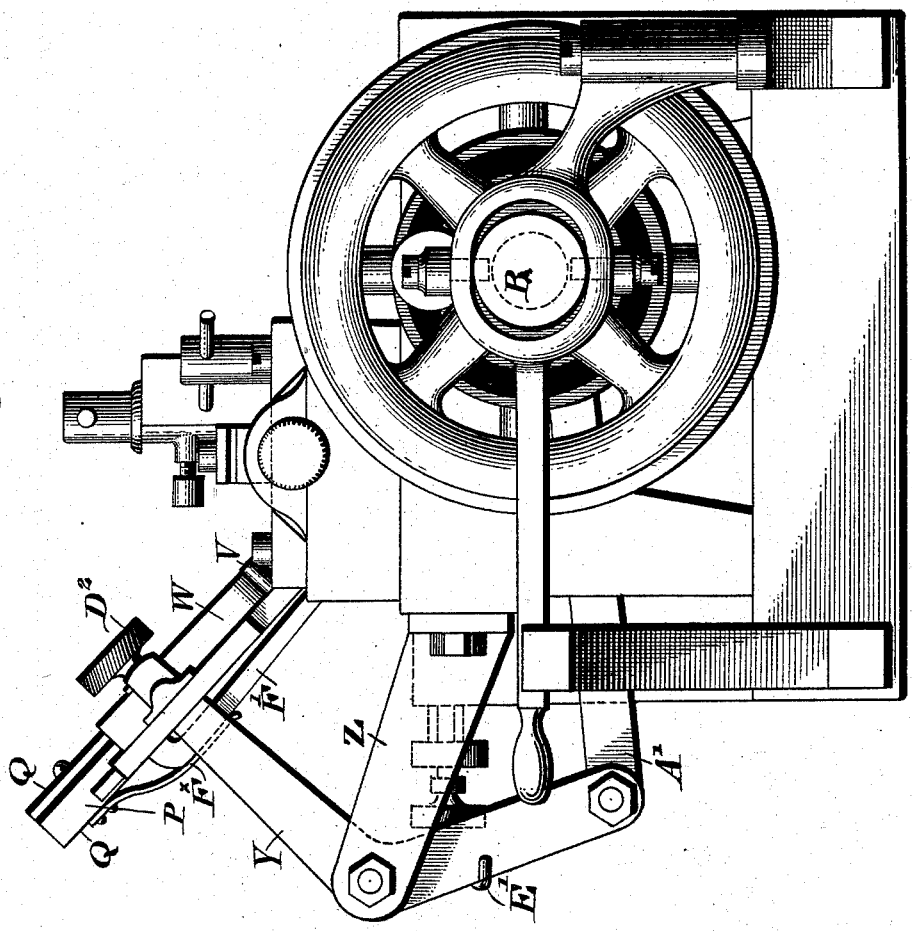

Figure 1 represents a side elevation of a type dressing machine embodying our invention. Fig. 2 represents a longitudinal vertical section thereof, on line $x, x$, Fig. 6. Fig. 3 represents a transverse vertical section of a portion on line $y, y$, Fig. 1. Fig. 4 represents a transverse vertical section of a portion on line $z, z$, Figs. 1 and 2. Fig. 5 represents a bottom plan view of the scoring tool. Fig. 6 represents a top or plan view of the machine. Fig. 7 represents a perspective view of the feed chute and adjacent parts of the machine on an enlarged scale. Figs. 8 and 9 represent views of opposite ends of the machine, on an enlarged scale. Fig. 10 represents a vertical section of a portion on line $a, a$, Fig. 2, on an enlarged scale. Fig. 11 represents an enlarged view of the main shaft, a cam thereon and the yoke, and the roller of the jet-breaker arm. Fig. 12 represents a view of a cam that operates one of the type pushers, and another cam that operates the type-holding bar of the feed chute. Fig. 13 represents a perspective view of a type with a jet thereon, and Fig. 14 represents a perspective view of a dressed type.

Similar letters of reference indicate corresponding parts in the several figures.

Referring to the drawings: A designates the frame of the machine on which is mounted the driving shaft B. C designates a cam on said shaft B, and D designates a lever which is mounted on its lower end on the frame, and engages on its upper end with the oscillating block E which is mounted on the pusher or push bar F, the latter being supported on the bed G of the frame.

Connected with the frame A, and the lever D is a spring $D^×$ for causing the return motion of said lever D and connected parts.

H designates a vertical rising and falling slide which is fitted in guides J in the frame A, and carries on its lower end the head K, which is engaged by the arm L, see Fig. 10, which arm is pivoted to the frame A, and operated by the cam M on the shaft B, the return motion being accomplished by a spring $M^×$, see Figs. 1 and 2, it being noticed that when the slide is in its lowest position, a horizontal recess N exists at the top of the same to receive a type from the chute P, as will be hereinafter set forth, said chute consisting of obliquely-arranged or vertical plates Q, with a flange R at one side thereof, leaving the channel S into which the type are fed, and from which they reach the recess N. Between the plates Q, near the lower portion thereof, and extending across said channel S, is a horizontally-arranged bar or jet-breaker T, see Fig. 7, which has a shoulder U on the end below the flange R for temporarily supporting the type, and breaking the jets thereof, as will be hereinafter set forth. The end of the breaker opposite to said shoulder is engaged by a cam $U^×$, and carries a pin V, which is pressed by a spring W, secured to the chute, by which provisions reciprocating motions are imparted to the breaker T. The cam $U^×$ is on the lower end of a slide X, which, fitted in a guide on the side of the chute, is engaged by an elbow lever Y, whose bearings are on the part Z of the frame A, the lower limb of said lever being connected with one end of the arm A', the other end of which is provided with a loop-shaped yoke B' encircling the shaft B, and carrying a roller C', which is engaged by the cam D' on the shaft B. Bearing against said lever Y, is a spring E', by means of which and the cam D' motion is imparted to said lever Y in opposite directions, thus raising and lowering the slide X, and the cam $U^×$ thereon, the effect of which is the operation of the jet-breaker T to the right and left.

Projecting into the channel S is the upper end of a presser-arm F', for temporarily holding and detaining the type in said channel, said arm being mounted on the frame A and having its lower end provided with a roller G' which is adapted to be engaged by a curved cam H', on the cam Z', on the shaft B, said arm F' being also engaged at its upper end by a spring F$^\times$ which is secured to the chute P, it being evident that when said cam Z' is rotated, the cam H' bears against the roller G' thus raising the lower limb of the arm F' and consequently lowering the upper limb of the same. Owing to the spring F$^\times$, motion is imparted to the arm in opposite directions, whereby the upper end of said arm is raised and forced inwardly against the type in the channel S for temporarily holding the same while the type below is being subjected to the jet-breaking operation, and preventing the type crowding one on the other in said channel S.

On the frame, in the present case to the left of the pusher F, is a bed J', whose upper face coincides, or is parallel with the top of the slide H, when the latter is in its highest position, aside of which are the dressers K', whose edges face upwardly, above which are the dressers K$^2$, whose edges face downwardly, said dressers being secured to a block K$^3$, which is supported above said bed J'. The edges of said dressers K', K$^2$ are separated sufficiently to allow the ends of the type to pass between the same and contact therewith, while the type rests on said bed J', as will be seen in Fig. 3. At the end of the bed J' is a curved spring L', see Fig. 2, between which spring and the end of said bed is a passage M' which is of somewhat segmental form and has its upper end opening laterally toward said bed J', and its lower end opening downwardly toward the bed N', which is parallel with the bed J', but below the same, said passage M' being adapted to direct the type from one bed to the other and impart a quarter turn to the same. The spring L' is secured at its upper end to the block K$^3$, and it depends therefrom. Above the bed N' is a block N$^2$, between which bed and block is a horizontal channel P' for the passage of the type while supported on said bed N'. See Figs. 2 and 4. Secured to said bed and block are dressers Q', Q$^2$, whose edges face each other, and are separated to leave a space between them corresponding to the channel P', so that the ends of the type come in contact with said edges. See Fig. 4.

Secured to the block N$^2$ by means of a stirrup N$^3$ on said block, said stirrup being vertically and horizontally adjustable and occupying part of the channel P', near the outer end thereof, is a scoring or grooving tool R', whose cutting edge extends horizontally so as to have the jet-removed ends of the type come in contact therewith for the purpose of forming grooves in said ends, as will be seen in Figs. 2, 5 and 14.

The lower end of the curved spring L' engages with a sustaining arm S', which is pivoted at top to the frame between the bed J' and block N$^2$, said arm being pressed toward said spring by a spring T', which is secured to said block N$^2$, see Fig. 2, so that while said spring L' is permitted to yield to allow the type to enter the channel M', it presses firmly against the type to steady and guide the latter in their movement through said channel.

Below the bed J' is a pusher U', whose working end when in normal position, is at the side of the base of the channel M', in the present case at the right, and just below the same, said working end being parallel with the channel P' so that when a type is at said base, it is engaged by said pusher and forced into said channel P' and thus subjected to the action of the dressers Q', Q$^2$ and the scoring tool R'. The pusher U' is connected with a pin V' which is fitted in an oscillating block W', the latter being mounted in a swinging arm X', whose bearings are on the table Y' of the frame, said arm being engaged by a cam Z' on the shaft B, and pressed by a spring A$^2$, see Figs. 1 and 2, and the dotted representation Fig. 6, by which provision the pusher U' is advanced and returned.

As has been stated, the chute P is formed of two plates Q, and the side flange R. Between said plates are placed blocks or type B$^2$, which are rested on the back plate and employed as gages for the type in the channel S of said chute. See Fig. 7. The plates are clamped together by a screw D$^2$, whereby the gages B$^2$ are retained in position, and the same are accessible when the screw is removed and the outer plate displaced. The inner face of the outer plate Q has a rib E$^2$, see Fig. 6, which rib partly occupies the channel S of the chute P, so that the type are guided in their descending motions in said chute, and lateral displacement of the outer plate Q is prevented.

The operation is as follows: The machine is started and the shaft B imparts motion to the various movable parts. The type are fed one upon the other in the direction of their length into the channel S of the chute P, the jets being below the lowermost type then resting upon the shoulder U of the breaker T. The cam U' on the slide X now advances the breaker, and as the body of the type rests against the flange R, and the jet is pressed outwardly by the breaker, said jet is broken off, and falls away, as shown in dotted lines Fig. 7. The breaker now recedes as it is relieved of the cam U$^\times$ and controlled by the spring W, and the type being released of the shoulder U, descends the portion of the channel S below the breaker and is directed into the recess N at the top of the slide H, said recess N being in communication with said channel S. The type just above the one broken has been held meanwhile by the arm or presser F' which has returned due to the spring F$^\times$, and as the said arm again withdraws the type drops and is caught and sustained by the shoulder U, the breaker having again advanced. The first type is now raised by the slide H, and so placed true in the path of the pusher F and the latter then advances by the action of the lever D and the type directed to the passage or channel M', and subjected to the action of the dressers K', K², whereby two opposite sides of the type are dressed, in the present case the broad sides. See Fig. 3. When the type traverses the entire passage M', and when it reaches the bottom thereof, it has received a quarter turn and so placed on the bed N', when the pusher U' advances and moves the type to the channel P' and subjects it to the action of the dressers Q', Q², which dress the remaining flat sides. See Fig. 4. The type are guided through said channel P' by means of a vertical plate N×, which enters the side groove of the type, as shown in said Fig. 4. When the type has nearly reached the terminus of the channel P', its end passes the scoring tool R', when the groove $a$ is formed in the same, as shown in Figs. 2, 4 and 5. Meanwhile the second type has been divested of its jet, and dropped into the recess N, raised by the slide H and engaged by the pusher F. Other type are subjected to the same operations, and as they successively reach the bed J', they are disposed side by side thereon, and form a row of type, which row is moved along by the accession of the last type, which is always engaged by the pusher F, the same being true of the pusher U'. When the type leave the channel P', they may be collected or directed to a place of deposit. When the type travel through the channel M' they are prevented from leaving the same, owing to the spring F² which is secured to the block N², and yieldingly closes the side of said channel. See Fig. 1.

Should a type without a jet, be supplied to the machine, when it reaches the breaker, its end $b$ will drop on the upper edge G² of the breaker which projects into the channel S, said edge thus freely supporting said type without pressing the latter against the flange R, and consequently breaking the same.

The bed J' has in its upper face a spring-pressed dog H² for preventing back action of the type as they approach and enter the channel M'.

The forward end of the pusher F is faced or clad with an angular plate J², underneath which is a space to receive the type when raised by the slide H, and advanced by said pusher, said plate being vertically adjustable by the screw K× which connects said plate with the pusher, the adjustment being regulated by a bar L², which may be a type, the same being inserted between the top limb of the plate J², see Figs. 2 and 7, said plate being connected with a plate J³ on the pusher, see Fig. 6, by which provision the plate J² is adapted to have vertical motion imparted to it and to be raised in place.

Having thus described our invention, what we claim as new, and desire to secure by Letters Patent, is—

1. The slide H and the guides J therefor, adapted to form the recess N at the top of said parts, in combination with the arm L, which is connected with said slide, the operating cam M on the shaft B, the spring M× attached to said slide, and a type-feeding chute which is adapted to communicate with said recess, substantially as described.

2. In a machine for dressing type, the adjustable plates Q having a flange R at one side thereof forming the channel S, and the jet breaker T guided between said plates and having the shoulder U and upper edge G² projecting into said channel, said parts being combined substantially as described.

3. The adjustable plates Q with a flange R at one side forming the channel S, the jet breaker T guided between said plates and having the shoulder U projecting into said channel, mechanism for imparting a reciprocating motion to said breaker, and an arm entering said channel, and bearing against a type therein, said parts being combined substantially as described.

4. The adjustable plates Q with a flange R having an opening in its side and forming the channel S, the jet breaker T guided between said plates and having the shoulder U thereon opposite said opening in said flange, a reciprocating slide with a cam thereon engaging said breaker, and a spring bearing against said breaker, said parts being combined substantially as described.

5. In a machine for dressing type, a type feeding chute consisting of two plates with a flange on one side forming a channel, one of said plates having a rib partly occupying said channel, and means for securing said chute in an inclined position on the outer side of said machine, said parts being combined substantially as described.

6. In a machine for dressing type, a pusher having an angular plate facing its front end, an adjusting screw secured to the top limb of said plate, and a gage bar between said top limb and said pusher, said parts being combined substantially as described.

7. A type feeding chute having a channel, a pivoted arm having a limb entering said channel, a spring bearing against said limb, a roller on the other limb of said arm, a shaft with the cam Z' thereon, and a curved cam H' on cam Z' said parts being combined substantially as described.

8. The operating cam U× and the slide X carrying the same, in combination with the lever Y, which is connected with said slide, the arm A' pivoted to said lever, the yoke B' on said arm, the driving shaft B, the cam D' on said shaft, the roller C' on the arm A', and a spring bearing against said lever, said yoke freely encircling said shaft, substantially as described.

9. In a type dressing machine, the block K³, the curved spring L' secured thereto, a sustaining block secured to the lower end of the said spring, a stationary block and a spring secured thereto and bearing against said sustaining block, said parts being combined substantially as described.

10. In a type dressing machine, a frame with the bed J', the pusher U' below the said bed, the channel M', and the channel P' continuous thereof, the table Y' on said frame, the swinging arm X' with bearings on said table, the oscillating block W' mounted on said arm and having the pin V' fitted therein, a shaft on said frame and the cam Z' on said shaft, said parts being combined substantially as described.

11. In a type dressing machine, two sets of beds and dressers having between them the channel M', said beds and dressers being adapted to turn the type, in combination with the bent spring L', which forms one side of said channel, the pivoted sustaining block S' on the frame, engaging said spring, and the spring T' on the frame bearing against said block S', substantially as described.

GEO. REHFUSS.
JOHN GEORGE REHFUSS.
MARTIN O. REHFUSS.

Witnesses:
JOHN A. WIEDERSHEIM,
WM. C. WIEDERSHEIM.